Figure 1:
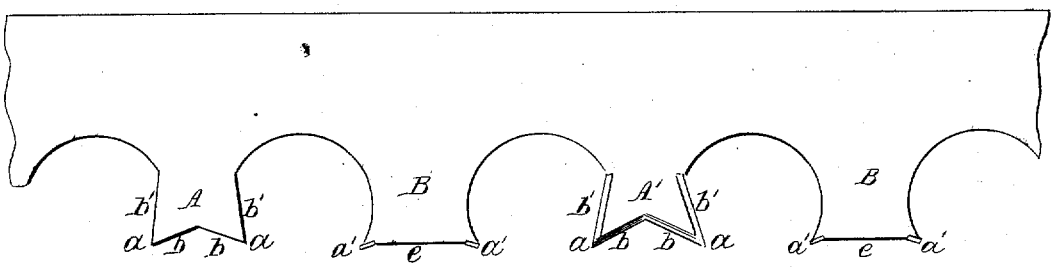

A. Boynton,
Saw.

No. 3,566. Reissued July 27, 1869.

Witnesses
J. C. Wildman
J. H. S. Miller

Inventor
E. M. Boynton, assignee
By Alex. A. C. Hauke & Co
his Attorneys

N. PETERS, PHOTO-LITHOGRAPHER, WASHINGTON, D. C.

UNITED STATES PATENT OFFICE.

EBEN MOODY BOYNTON, OF GRAND RAPIDS, MICHIGAN, ASSIGNEE OF ALFRED BOYNTON.

IMPROVEMENT IN SAWS.

Specification forming part of Letters Patent No. 59,951, dated November 27, 1866; Reissue No. 2,695, dated July 23, 1867; Reissue No. 3,566, dated July 27, 1869.

*To all whom it may concern:*

Be it known that ALFRED BOYNTON, of the township of Wright, in the county of Ottawa and State of Michigan, did invent certain new and useful Improvements in the Construction of Saws; and I do hereby declare the following to be a full, clear, and exact description thereof, reference being had to the accompanying drawings, which make part of this specification.

My invention relates to saw-teeth; and consists in the peculiar shape of the cutting and clearing teeth, and their arrangement, as hereinafter more fully described.

It has hitherto been usual to construct the teeth of saws of this class of V shape, in which case cutting is performed by drawing the inclined edge of the tooth across the fiber and applying more or less pressure to the saw.

In my invention the tooth is so constructed as to perform the operation of cutting by direct action, as a plane-bit, the edge of the tooth being projected to cut the fiber at an angle opposite to the old V-tooth by direct action.

I construct these improved teeth in the form of an inverted M, or nearly so, there being two cutting-points, *a a*, on each tooth, with a cutting-edge, *b* and *b′*, on each side of said points *a a*, the outer cutting-edges, *b′*, being inclined inward slightly from the points *a* toward the body of the saw, as represented in the drawings.

Two consecutive cutting-points in one base or tooth are dressed to cut on one side, the next succeeding tooth reversed to cut on the other side of kerf as often as cutting-teeth are employed. The teeth thus formed constitute the principal cutting-teeth of the saw, and, being presented to the fiber at an acute angle, tend to raise the cut portion up from the solid or uncut portion, and will cut it with greater facility and ease.

B are clearer-teeth, and are straight along their horizontal face, as represented at *e*, with a small tooth or point, *a*, formed at each extremity. These points *a* project slightly beyond the face *e*, and are filed beveling each way from the center on their under face. Their object or duty is to clear away the sawdust formed by the cut of the teeth A A′ directly in advance of the points *a*, removing the particles of sawdust until it is carried out of the timber. It will thus be seen that the dust cut by the preceding teeth A or A′ is cleared away by the following clearer-tooth B, thus leaving a clear path for the cut of the succeeding cutting-teeth.

By the construction of my teeth A A′ each set cuts at both the forward and the backward motion of the saw, and one set cuts on one and the next succeeding set on the other side of the kerf at the same time in both motions of the saw, as their cutting-faces are on opposite sides of the cut.

In each forward or backward motion of the saw the cutting-faces *b b* and *b′ b′* respectively operate, while the clearing-teeth B remove the sawdust formed by the teeth A A′.

Having thus described my invention, what I claim as new, and desire to secure by Letters Patent, is—

1. A saw provided with teeth A A′, having two cutting-points, *a a*, as shown, with cutting-edge on each face *b b′*, and their outer cutting-faces inclined inward from the point, substantially as shown and described.

2. The tooth A, with its two points dressed to cut on one side of the kerf, and the next succeeding cutting-tooth, A′, with its two points dressed to cut on the other side of the kerf, as set forth.

3. The clearing-tooth B, constructed substantially as shown and described.

EBEN MOODY BOYNTON.

Witnesses:

DANIEL LYNCH,

J. F. CONROY.